J. H. SHAW.

Assignor to SARGENT & Co.

MINCING MACHINE.

No. 10,717. Reissued Apr. 27, 1886.

Witnesses

J. H. Shumway

Fred C. Earle

John H. Shaw

Inventor

By Atty.

Wm. Earle

THE NORRIS PETERS CO., PHOTO-LITHO., WASHINGTON, D. C.

UNITED STATES PATENT OFFICE.

JOHN H. SHAW, OF NEW HAVEN, CONNECTICUT, ASSIGNOR TO SARGENT & CO., OF SAME PLACE.

MINCING-MACHINE.

SPECIFICATION forming part of Reissued Letters Patent No. 10,717, dated April 27, 1886.

Original No. 337,631, dated March 9, 1886. Application for reissue filed March 25, 1886. Serial No. 196,570.

*To all whom it may concern:*

Be it known that I, JOHN H. SHAW, of New Haven, in the county of New Haven and State of Connecticut, have invented new Improvements in Mincing-Machines; and I do hereby declare the following, when taken in connection with accompanying drawings, and the letters of reference marked thereon, to be a full, clear, and exact description of the same, and which said drawings constitute part of this specification, and represent, in—

Figure 2:
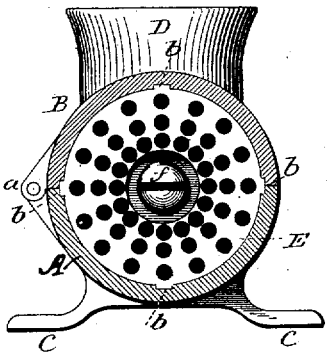
Figure 1:
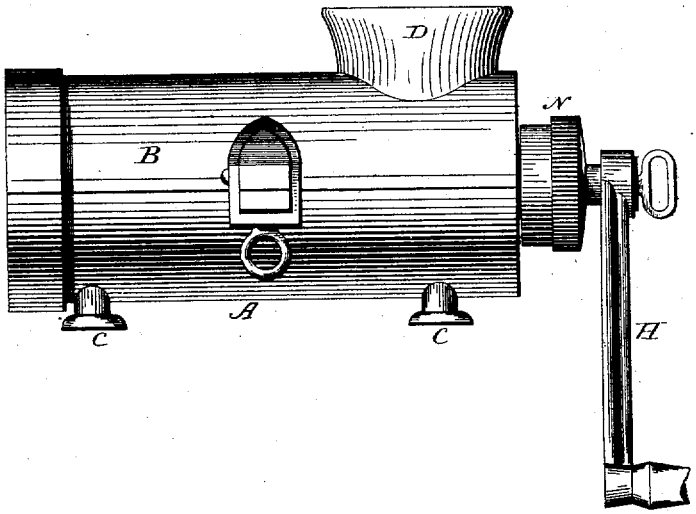
Figure 4:
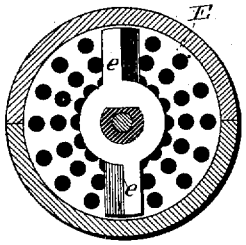
Figure 3:
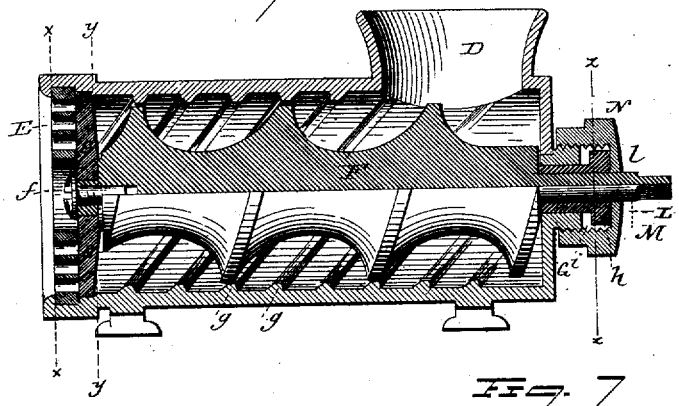
Figure 6:
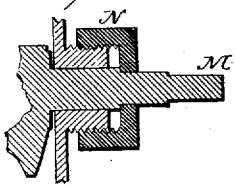
Figure 5:
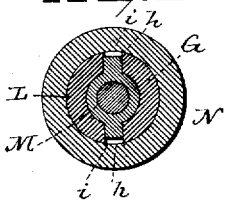
Figure 7:
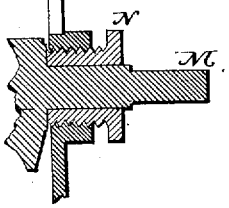

Figure 1, a side view; Fig. 2, an end view, a portion of the case removed to show the perforated plate as supported within the case, on line *x x*, Fig. 3; Fig. 3, a longitudinal central section showing a side view of half the feed-screw; Fig. 4, a transverse section inside the cutters, looking toward the perforated plate on line *y y*, Fig. 3; Fig. 5, a transverse section on line *z z* of Fig. 3; Figs. 6 and 7, views of modifications in the construction of the adjusting devices.

This invention relates to an improvement in that class of machines for mincing meat and like materials in which a perforated plate is arranged at one end of a cylindrical case in a plane at right angles to the axis of the cylinder, with a cutter arranged to rotate in substantially close contact with one surface of the said perforated plate and a screw or other suitable follower arranged to force the material within the case through the perforations in the said plate, the cutter working through the mass and cutting off at each perforation.

The object of this invention is principally to make a ready and easy adjustment of the cutter or cutters with relation to the perforated plate; and it consists in the construction, as hereinafter described, and more particularly recited in the claims.

The case is of cylindrical shape, and here represented as made in two parts, A B, A being the lower part and supported upon suitable legs C, or otherwise, the part B hinged to the part A, as at *a*, the division being longitudinal and in a horizontal plane. At one end the part B is constructed with a hopper, D, through which the material to be cut or minced is introduced into the case. At the opposite end of the case a perforated plate, E, is arranged. This plate is set into the case and interlocked therewith by projections *b*, entering corresponding cavities in the parts of the case, as seen in Figs. 2 and 3, and so that the plate is rigidly supported in all directions, as if it were an integral part of the case. The plate is perforated with numerous holes, in size corresponding to the work to be accomplished.

Within the case the follower F is arranged. This follower is in the form of a screw supported in a bearing, G, at the end of the case opposite the perforated plate, and so as to be revolved by means of a crank, H, or otherwise. The periphery of the spiral rib forming the screw should run substantially in contact with the inner surface of the case. At its end next the perforated plate one or more cutters, *e*, are arranged, extending radially from the axis of the screw, but in a plane parallel with the inner surface of the plate, and fixed to the screw and so as to revolve with it.

The cutters may be made as an integral part of the screw; but I prefer to construct them so as to set over a non-cylindrical projection on the end of the screw against a shoulder thereon, and so as to be secured by a suitable screw, *f*, or other device, which will rigidly hold the cutters in connection with the screw.

I construct the internal surface of the case with spiral ribs *g*, running toward the perforated plate, the inclination of thread being by preference about forty-five degrees, or considerably greater than the inclination of the spiral-rib of the screw or follower, and I arrange several of these ribs (here represented as three) to the single pitch of the follower or feed-screw, the internal diameter of the ribs in the case corresponding substantially to the external diameter of the spiral rib of the screw-follower.

The material to be cut or minced is introduced through the hopper D in the usual manner, and under the revolution of the screw F such material is fed or forced toward the perforated plate E, and through the perforations in the plate. The cutter or cutters *e* pass through the mass of material at the inner surface of the plate, and therefore cut the portions which have passed into the perforations from the mass within the case in the well-known manner. The resistance of the mass to movement through the case and perforations tends to force the screw or follower rearward from the plate, and such resistance is met by the bearing at the opposite end of the case.

In order that the cutters may work in such relation to the plate as to properly sever the portions which enter the perforations from the mass at the rear, it is necessary that the cutters should be nicely adjusted with relation to the surface of the plate. To conveniently do this, I arrange a bushing, L, within the bearing G, the internal diameter of which corresponds to the shaft M of the screw. The said bushing extends through the bearing and so as to abut against the shoulder at the junction of the shaft and screw, as seen in Fig. 3. This bushing is movable longitudinally in the bearing, but is interlocked with the bearing, so as to prevent rotation, by constructing the bushing with lugs *h*, which enter corresponding notches, *i*, in the bearing, as seen in Fig. 5. The bearing G is formed on the lower part of the case, and as a permanent and integral part thereof, and projects outside the end of the case. It is cylindrical in shape and screw-threaded upon its outer surface. Onto the outer surface of the bearing a corresponding screw-threaded nut, N, is applied, adapted to be screwed thereon toward or from the end of the case, according to the direction in which the nut is turned. The nut has an internal flange, *l*, at its outer end, to bear against the end of the bushing L, as seen in Fig. 3, and so that as the nut is screwed onto the bearing it will force the follower inward against the end of the feed-screw or follower F, and correspondingly move the said follower, with its cutters, toward the perforated plate at the opposite end of the cylinder; or, unscrewing the nut N, the bushing L will be permitted to fall back, and with it the feed-screw F and cutters, away from the inner surface of the plate E. Therefore by turning the said nut N in one direction or the other the cutters may be readily adjusted into the proper relation to the inner surface of the perforated plate. This adjustment being at the end of the case opposite the perforated plate, enables the adjustment to be made while the machine is in operation—a specially great advantage where the machines are run by power, as it avoids stopping the machine, as must be the case where the adjustment is made at the opposite end. As the feed screw or follower runs in substantially close contact with the inner surface of the case or the ribs therein, the screw is afforded a substantial bearing throughout its entire length, so that no support or bearing is necessary at the discharge end.

While I prefer to employ the bushing L, between the nut and the feed-screw, it may be omitted and the shaft constructed with a shoulder, as seen in Fig. 6; or the bearing may be internally screw-threaded, and the nut adapted to surround the shaft and screw into the bearing against a shoulder on the screw, as seen in Fig. 7; but the bushing interlocked with the fixed bearing, adapted to take the force of the nut, prevents the possibility of the nut being turned under friction between it and the shaft or feed-screw, as might be the case in either of the modifications, Fig. 6 or 7.

The two parts of the case are provided with a suitable locking device to secure them together, as seen in Fig. 1, or otherwise, it being necessary that the parts shall be firmly held together when the machine is in operation.

It will be understood from the foregoing that I am aware that a mincing-machine consisting of a cylindrical case with a perforated plate at one end and a spiral revolving feed within the case, with cutters arranged to rotate upon the inside of the perforated plate, so that the material in the case is forced toward and through the perforations by the revolving follower in the case, and the material cut by the cutters running adjacent to the inner face of the perforated plate, is a construction old and well known, and that I therefore in this application make no claim, broadly, to such construction and combination of devices.

I claim—

1. The combination of the cylindrical case, the perforated plate E, rigidly supported in one end of the case, the case provided with a hopper near the opposite end, a feed-screw arranged longitudinally within the said case and carrying one or more radial cutters at its end next said perforated plate, the said cutters adapted to revolve in a plane parallel with and adjacent to the inner surface of said perforated plate, the shaft of the said feed-screw extending through a bearing at the end of the case opposite the perforated plate and there provided with means for its rotation, with a screw-nut at said bearing around the shaft, between the end of the case and the said means for the rotation of the said shaft, adapted to adjustably support said feed-screw and cutters against longitudinal movement from said perforated plate, substantially as described.

2. The combination of the cylindrical case, the perforated plate E, rigidly supported in one end of the case, the case provided with a hopper near the opposite end, a feed-screw arranged longitudinally within the said case and carrying one or more radial cutters at its end next said perforated plate, the said cutters adapted to revolve in a plane parallel with and adjacent to the inner surface of said perforated plate, the shaft of the said feed-screw extending through a bearing at the end of the case opposite the perforated plate and there provided with means for its rotation, a bushing around said shaft and interlocked with the bearing to prevent the rotation of the bushing with the shaft, and yet leave the bushing free for longitudinal movement, the said bushing being adapted to bear against a shoulder on said feed-screw, and a nut on said bearing adapted to bear said bushing against said shoulder on the feed-screw, to adjustably support said feed-screw and cutters against longitudinal movement from said perforated plate, substantially as described.

3. The combination of the cylindrical case, a perforated plate, E, rigidly supported in one end of the case, the case provided with a hopper near the opposite end, a feed-screw arranged longitudinally within said case and carrying one or more radial cutters at its end next said perforated plate, the said cutters adapted to revolve in a plane parallel with and adjacent to the inner surface of said perforated plate, the shaft of the said feed-screw extending through a bearing at the end of the case opposite the perforated plate and there provided with means for its rotation, and an adjusting device, substantially such as described, at the bearing in the end of the case opposite said perforated plate and between the said end of the case and the means for the rotation of the shaft, whereby the relation of the cutters to the plate may be adjusted, substantially as described.

4. The combination of the cylindrical case, a perforated plate, E, rigidly supported in one end of the case, the case provided with a hopper near the opposite end, a feed-screw arranged longitudinally within said case and carrying one or more radial cutters at its end next said perforated plate, the said cutters adapted to revolve in a plane parallel with and adjacent to the inner surface of said perforated plate, the inner surface of the case provided with spiral ribs around its inner surface, the inclination of which is greater than that of the spiral rib which forms the feed-screw, the internal diameter of said ribs corresponding to the external diameter of the spiral rib on the feed-screw, substantially as described.

JOHN H. SHAW.

Witnesses:
WM. S. COOKE,
CHAS. L. BALDWIN.